(12) United States Patent
Patapoutian et al.

(10) Patent No.: US 7,253,984 B1
(45) Date of Patent: Aug. 7, 2007

(54) DISK DRIVE THAT GENERATES A POSITION ERROR SIGNAL AND A FLY HEIGHT SIGNAL FROM A SERVO BURST PATTERN

(75) Inventors: Ara Patapoutian, Hopkinton, MA (US); Michael Leis, Framingham, MA (US)

(73) Assignee: Maxtor Corporation, Longmont, CO (US)

( * ) Notice: Subject to any disclaimer, the term of this patent is extended or adjusted under 35 U.S.C. 154(b) by 302 days.

(21) Appl. No.: 11/066,695

(22) Filed: Feb. 25, 2005

Related U.S. Application Data

(60) Provisional application No. 60/624,733, filed on Nov. 3, 2004, provisional application No. 60/606,846, filed on Sep. 2, 2004.

(51) Int. Cl.
*G11B 21/02* (2006.01)
(52) U.S. Cl. .................................................. 360/75
(58) Field of Classification Search ............. 360/46, 360/75, 77.08, 77.04, 60, 55
See application file for complete search history.

(56) References Cited

U.S. PATENT DOCUMENTS

| | | | | |
|---|---|---|---|---|
| 5,825,579 A | * | 10/1998 | Cheung et al. | 360/77.08 |
| 5,844,742 A | * | 12/1998 | Yarmchuk et al. | 360/75 |
| 5,875,064 A | * | 2/1999 | Chainer et al. | 360/75 |
| 5,907,447 A | * | 5/1999 | Yarmchuk et al. | 360/75 |
| 5,909,330 A | | 6/1999 | Carlson et al. | 360/31 |
| 5,923,492 A | | 7/1999 | Liikanen | 360/77.08 |
| 5,966,264 A | | 10/1999 | Belser et al. | 360/77.08 |
| 6,078,445 A | * | 6/2000 | Serrano et al. | 360/46 |
| 6,094,318 A | * | 7/2000 | Kim | 360/60 |
| 6,157,511 A | | 12/2000 | Liikanen | 360/77.08 |
| 6,256,160 B1 | | 7/2001 | Liikanen et al. | 360/48 |
| 6,429,995 B1 | * | 8/2002 | Dobbek et al. | 360/77.08 |
| 6,433,950 B1 | | 8/2002 | Liikanen | 360/77.08 |
| 6,469,859 B1 | * | 10/2002 | Chainer et al. | 360/75 |
| 6,515,818 B1 | * | 2/2003 | Harmer | 360/77.08 |
| 6,522,493 B1 | * | 2/2003 | Dobbek et al. | 360/75 |
| 7,154,700 B1 | * | 12/2006 | Schreck et al. | 360/77.04 |
| 2002/0030920 A1 | * | 3/2002 | Min et al. | 360/77.04 |

* cited by examiner

*Primary Examiner*—Fred F. Tzeng
(74) *Attorney, Agent, or Firm*—Myers Bigel Sibley & Sajovec, PA

(57) ABSTRACT

A disk drive includes a rotatable data storage disk, a transducer, an actuator, and a servo burst demodulator. The disk includes a servo burst pattern thereon within a single servo sector. The transducer is configured to generate a read signal from the servo burst pattern. The actuator is configured to position the transducer relative to the disk. The servo burst demodulator is configured to generate a position error signal from the contributions of the servo burst pattern to the read signal, and is configured to generate a fly height signal from the contributions of the servo burst pattern to the read signal. The position error signal is indicative of a radial location of the transducer relative to the disk. The fly height signal is indicative of a height of the transducer from the disk.

19 Claims, 6 Drawing Sheets

DISK DRIVE THAT GENERATES A POSITION ERROR SIGNAL AND A FLY HEIGHT SIGNAL FROM A SERVO BURST PATTERN

RELATED APPLICATION

This application claims the benefit of and priority to U.S. Provisional Patent Application No. 60/624,733, filed Nov. 3, 2004 and to U.S. Provisional Patent Application No. 60/606, 846, filed Sep. 2, 2004, the disclosures of which are hereby incorporated herein by reference as if set forth in their entirety.

FIELD OF THE INVENTION

The present invention relates to disk based storage devices and, more particularly, to positioning transducers based on servo burst patterns on a disk.

BACKGROUND OF THE INVENTION

A simplified diagrammatic representation of a disk drive, generally designated as 10, is illustrated in FIG. 1. The disk drive 10 includes a data storage disk 12 that is rotated by a spindle motor 14. The spindle motor 14 is mounted to a base plate 16. An actuator arm assembly 18 is also mounted to the base plate 16.

The actuator arm assembly 18 includes a transducer 20 (or head) mounted to a flexure arm 22 which is attached to an actuator arm 24 that can rotate about a pivot bearing assembly 26. The actuator arm assembly 18 also includes a voice coil motor (VCM) 28 which moves the transducer 20 relative to the disk 12. The spindle motor 14, and actuator arm assembly 18 are coupled to a number of electronic circuits 30 mounted to a printed circuit board 32. The electronic circuits 30 can include, for example, a digital signal processor (DSP), a microprocessor-based controller and a random access memory (RAM) device.

Although a single disk 12 is illustrated in FIG. 1, the disk drive 10 may instead include a plurality of disks. For example, FIG. 2 illustrates a disk stack 15 that includes a plurality of disks 12, each of which may have a pair of data storage surfaces 36. The disks 12 are mounted on a cylindrical shaft and are designed to rotate about axis 38. The spindle motor 14 as mentioned above, rotates the disk stack 15.

Referring now to the illustration of FIGS. 1-3, the actuator arm assembly 18 includes a plurality of the transducers 20, each of which correspond to one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36. The transducers 20 are configured to fly adjacent to the disk surfaces 36 on air bearings.

FIG. 4 further illustrates one of the disks 12. Data is stored on the disk 12 within a number of concentric tracks 40 (or cylinders). Each track is divided into a plurality of radially extending sectors 42 on the disk 12. Each sector 42 is further divided into a servo sector 44 and a data sector 46. The servo sectors 44 of the disk 34 are used to, among other things, accurately position the transducer 20 so that data can be properly written onto and read from the disk 12. The data sectors 46 are where non-servo related data (i.e., user data) is stored and retrieved. Such data, upon proper conditions, may be overwritten. Unlike information in the data sectors 46, the servo sectors 44 should not be overwritten or erased during normal operation of the disk drive 10.

To accurately write data to and read data from the data sectors 46 of the disk 12, it is desirable to maintain the transducer 20 at a relatively fixed position with respect to a centerline of a designated track 40 during writing and reading operations (called a track following operation). To assist in controlling the position of the transducer 20 relative to the tracks 40, the servo sectors 44 contain, among other things, servo information in the form of servo burst patterns that include groups of servo bursts, as is well-known in the art.

A servo burst pattern 50 that includes first, second, third and fourth servo bursts A, B, C and D, respectively, is shown in FIG. 5. The servo burst pattern 50 can be located at, for example, radial locations n−1 to n+4, and are drawn in a straight, rather than arcuate, fashion for ease of depiction. The servo bursts A, B, C, D are accurately positioned relative to each other. Although not illustrated, the servo sector 44 may also include a write/read (W/R) recovery field, an automatic gain control (AGC) field, a synchronization field, a sector number field, and/or a cylinder number field.

During the manufacturing process of the disk drive 10, a servo-track writer ("STW") (not shown) can is used to write the servo bursts A, B, C, D onto each of the servo sectors 44 of the disk 34. In FIG. 5, the distance (d) between each pair of horizontal grid lines represents ½ of the servo track pitch. Additionally, as depicted in FIG. 5, the transducer 20 has a width approximately equal to one-half of the servo track width. The transducer 20 is shown to be misaligned from the track centerline 48 of track n−1 to more clearly illustrate an example of its width.

As the transducer 20 is positioned over a track, it reads the servo information contained in sequential ones of the servo sectors 44 of the track as a read signal. The servo information is used to generate position error signals as a function of the misalignment between the transducer 20 and the track centerline 48. The position error signal is provided to a servo controller that performs calculations and outputs a servo compensation signal which controls the voice-coil motor 28 to position the transducer 20 relative to the track centerline 48.

When the transducer 20 is positioned exactly over the centerline 48 of track n, approximately one-quarter of the A burst will be read followed by one-quarter of the B burst, and their amplitudes will be equal in the read signal. As the transducer 20 moves off-track (i.e., off of the track centerline), the amplitude of one burst will increase while the amplitude of the other burst will decrease, depending on the direction of misalignment. Accordingly, the radial position of the transducer 20 relative to the tracks can be determined based the servo information in the read signal from the servo bursts A, B, C, D.

While reading and writing data on the disk 12, the transducer 20 rides above the disk surface on a cushion of air (known as an air bearing) that is created by the movement of the disk 12 under the transducer 20. The distance of the transducer 20 from the disk 12 while riding on the air bearing is referred to as the "flying height" of the transducer 20. Transducer "sliders" are generally used that have the requisite aerodynamic qualities to produce the "lift" needed to hold the transducer 20 away from the disk 12. In general, the performance and/or operation of the disk drive 10 can become degraded if a proper flying height of the transducer 20 is not maintained. For example, the read signal can become unreliable if the actual flying height of the transducer 20 is considerably higher than a nominal flying height, and undesirable contact of the transducer 20 and disk 12 can occur if the flying height is too low. Fly height can vary from one transducer 20 relative to disk surfaces within the disk stack 15, and can vary based on radial position of the transducer 20, air density (ambient temperature) and transducer 20 temperature.

SUMMARY OF THE INVENTION

In some embodiments of the present invention, a disk drive includes a rotatable data storage disk, a transducer, an actuator, and a servo burst demodulator. The disk includes a servo burst pattern thereon within a single servo sector. The transducer is configured to generate a read signal from the servo burst pattern. The actuator is configured to position the transducer relative to the disk. The servo burst demodulator is configured to generate a position error signal from the contributions of the servo burst pattern to the read signal, and is configured to generate a fly height signal from the contributions of the servo burst pattern to the read signal. The position error signal is indicative of a radial location of the transducer relative to the disk. The fly height signal is indicative of a height of the transducer from the disk.

In some further embodiments of the present invention, the servo burst pattern includes at least a first pair of radially adjacent servo bursts and a second pair of radially adjacent servo bursts. The first pair of radially adjacent servo bursts is circumferentially aligned with the second pair of servo bursts. The servo burst demodulator is configured to determine a separate contribution to the read signal from the circumferentially adjacent ones of the first and second pairs of servo bursts and a separate contribution to the read signal from the radially adjacent ones of the first and second pairs of servo bursts. The servo burst demodulator generates the position error signal based on the determined contribution to the read signal from the radially adjacent ones of the servo bursts. The servo burst demodulator generates the fly height signal based on the determined contribution to the read signal from the circumferentially adjacent ones of the servo bursts.

The servo burst demodulator may generate the fly height signal based on a logarithm of a ratio of the determined contribution to the read signal from the circumferentially adjacent ones of the servo bursts. The servo burst demodulator may generate the position error signal based on an arctangent of a ratio of the determined contribution to the read signal from the radially adjacent ones of the servo bursts.

The servo bursts in the first pair of radially adjacent servo bursts may be configured to generate contributions to the read signal that have different frequencies from one another. The servo bursts in the second pair of radially adjacent servo bursts may be configured to generate contributions to the read signal that have different frequencies from one another. Circumferentially aligned ones of the servo bursts in the first and second pairs may be configured to generate contributions to the read signal that have different frequencies from one another.

The servo burst pattern on the disk can further include third and fourth pairs of radially adjacent servo bursts. The third pair of radially adjacent servo bursts can be radially offset and circumferentially adjacent to the second pair of servo bursts, and circumferentially aligned with the fourth pair of servo bursts. The first pair of servo bursts may have servo bursts A1 and B2 that are radially aligned to one other. Servo burst A1 can be configured to generate a contribution to the read signal that has a first frequency and servo burst B2 can be configured to generate a contribution to the read signal that has a second frequency. The second pair of servo bursts can include servo bursts A2 and B1 that are radially aligned to one other. Servo burst A2 can be configured to generate a contribution to the read signal that has the second frequency. Servo burst B1 can be configured to generate a contribution to the read signal that has the first frequency. Servo burst A2 can be circumferentially aligned with and adjacent to servo burst A1. Servo burst B1 can be circumferentially aligned with and adjacent to servo burst B2.

The third pair of servo bursts can include servo bursts C1 and D2 that are radially aligned to one other. Servo burst C1 can be configured to generate a contribution to the read signal that has the first frequency, and servo burst D2 can be configured to generate a contribution to the read signal that has the second frequency. Servo burst C1 can be radially offset from and circumferentially adjacent to servo burst A2. servo burst D2 can be radially offset from and adjacent to servo burst B1. The fourth pair of servo bursts can include servo bursts C2 and D1 that are radially aligned to one other. Servo burst C2 can be configured to generate a contribution to the read signal that has the second frequency, and servo burst D1 can be configured to generate a contribution to the read signal that has the first frequency. Servo burst C2 can be circumferentially aligned with and adjacent to servo burst C1. Servo burst D1 can be circumferentially aligned with and adjacent to servo burst D2.

The servo burst demodulator can be configured to generate the fly height signal based on the following equation:

$$FH = \left(a * \log\left(\frac{\alpha_{1,1} + \alpha_{2,1}}{\alpha_{2,2} + \alpha_{1,2}}\right) + b * \log\left(\frac{\alpha_{3,1} + \alpha_{4,1}}{\alpha_{4,2} + \alpha_{3,2}}\right)\right) + c,$$

where FH is the fly height signal, a is a constant, b is a constant, c is a constant, $\alpha_{1,1}$, is the contribution of servo burst A1 to the read signal, $\alpha_{1,2}$, is the contribution of servo burst B2 to the read signal, $\alpha_{2,1}$ is the contribution of servo burst B1 to the read signal, $\alpha_{2,2}$ is the contribution of servo burst A2 to the read signal, $\alpha_{3,1}$ is the contribution of servo burst C1 to the read signal, $\alpha_{3,2}$ is the contribution of servo burst D2 to the read signal, $\alpha_{4,1}$ is the contribution of servo burst D1 to the read signal, and $\alpha_{4,2}$ is the contribution of servo burst C2 to the read signal.

The servo burst demodulator can be configured to generate the position error signal based on the following equation:

$$PES = c * \arctan\left(\frac{(\alpha_{1,1} - \alpha_{2,1}) + (\alpha_{2,2} - \alpha_{1,2})}{(\alpha_{3,1} - \alpha_{4,1}) + (\alpha_{4,2} - \alpha_{3,2})}\right) + b,$$

where PES is the position error signal, b is a constant, c is a constant, $\alpha_{1,1}$ is the contribution of servo burst A1 to the read signal, $\alpha_{1,2}$ is the contribution of servo burst B2 to the read signal, $\alpha_{2,1}$ is the contribution of servo burst B1 to the read signal, $\alpha_{2,2}$ is the contribution of servo burst A2 to the read signal, $\alpha_{3,1}$ is the contribution of servo burst C1 to the read signal, $\alpha_{3,2}$ is the contribution of servo burst D2 to the read signal, $\alpha_{4,1}$ is the contribution of servo burst D1 to the read signal, $\alpha_{4,2}$ is the contribution of servo burst C2 to the read signal. Although the constants in some of the different equations are referred to by the same letters (i.e., "b", "c", ... ) for simplicity of explanation, it is to be understood that the same constants referenced in different equations can have different values and can be unrelated to one another. For example, the constant "c" in the FH equation can have a different value, and can be unrelated to, the constant "c" in the PES equation.

The servo burst pattern can include a first group of four radially adjacent and aligned servo bursts and a second group of four radially adjacent and aligned servo bursts. The first and second groups of servo bursts can be circumferentially aligned with one another. The radially aligned ones of the servo bursts can be configured to generate contributions to the read signal that have different frequencies from one another. The circumferentially aligned ones of the servo bursts can be configured to generate contributions to the read signal that have different frequencies from one another. The servo burst demodulator can be configured to determine a separate contribution to the read signal from the circumferentially adjacent ones of the servo bursts and a separate contribution to the read signal from the radially aligned ones of the servo bursts. The servo burst demodulator can be configured to generate the position error signal based on the determined contribution to the read signal from the radially aligned ones of the servo bursts. The servo burst demodulator can be configured to generate the fly height signal based on the determined contribution to the read signal from the circumferentially aligned ones of the servo bursts.

The first group of four radially aligned servo bursts can include servo bursts A1, C1, B2, D2. The second group of four radially adjacent servo bursts can include servo bursts A2, C2, B1, D1. Servo bursts pairs A1 and A2, B1 and B2, C1 and C2, and D1 and D2 can be circumferentially aligned and configured to generate contributions to the read signal that have different frequencies from one another.

The servo burst demodulator can be configured to generate the fly height signal based on the following equation:

$$FH = \left(a * \log\left(\frac{\alpha_{1,1} + \alpha_{2,1}}{\alpha_{2,2} + \alpha_{1,2}}\right) + b * \log\left(\frac{\alpha_{1,3} + \alpha_{2,3}}{\alpha_{2,4} + \alpha_{1,4}}\right)\right) + c,$$

where FH is the fly height signal, a is a constant, b is a constant, c is a constant, $\alpha_{1,1}$ is the contribution of servo burst A1 to the read signal, $\alpha_{1,2}$ is the contribution of servo burst B2 to the read signal, $\alpha_{2,1}$ is the contribution of servo burst B1 to the read signal, $\alpha_{2,2}$ is the contribution of servo burst A2 to the read signal, $\alpha_{1,3}$ is the contribution of servo burst C1 to the read signal, $\alpha_{2,3}$ is the contribution of servo burst D1 to the read signal, $\alpha_{1,4}$ is the contribution of servo burst D2 to the read signal, and $\alpha_{2,4}$ is the contribution of servo burst C2 to the read signal.

The servo burst demodulator can be configured to generate the position error signal based on the following equation:

$$PES = c * \arctan\left(\frac{(\alpha_{1,1} - \alpha_{2,1}) + (\alpha_{2,2} - \alpha_{1,2})}{(\alpha_{1,3} - \alpha_{2,3}) + (\alpha_{2,4} - \alpha_{1,4})}\right) + b,$$

where PES is the position error signal, b is a constant, c is a constant, $\alpha_{1,1}$ is the contribution of servo burst A1 to the read signal, $\alpha_{1,2}$ is the contribution of servo burst B2 to the read signal, $\alpha_{2,1}$ is the contribution of servo burst B1 to the read signal, $\alpha_{2,2}$ is the contribution of servo burst A2 to the read signal, $\alpha_{1,3}$ is the contribution of servo burst C1 to the read signal, $\alpha_{2,3}$ is the contribution of servo burst D1 to the read signal, $\alpha_{1,4}$ is the contribution of servo burst D2 to the read signal, $\alpha_{2,4}$ is the contribution of servo burst C2 to the read signal.

The servo burst demodulator can include a buffer and a filter. The buffer can be configured to at least temporarily hold the contributions to the read signal from at least one of the first and second groups of servo bursts, and the filter can be configured to sequentially output the contribution from separate ones of the servo bursts in the buffer.

One of the servo bursts in the first pair of radially adjacent servo bursts can be configured to generate a contribution to the read signal that has a first frequency, and the other one of the servo bursts in the first pair can be configured to generate a contribution to the read signal that has a second frequency. One of the servo bursts in the second pair of radially adjacent servo bursts can be configured to generate a contribution to the read signal that has the first frequency, and the other one of the servo bursts in the second pair can be configured to generate a contribution to the read signal that has the second frequency. The servo burst demodulator can include at least two filters. One of the filters can be configured to isolate a contribution the read signal having the first frequency. The other one of the filters can be configured to isolate a contribution to the read signal having the second frequency. The servo burst demodulator can be configured to identify the separate contribution to the read signal from the servo bursts in the first and second pairs based on the contributions to the read signal from through the filters.

Some other embodiments of the present invention provide a method of generating information on a radial position and height of a transducer relative to a rotatable data storage disk in a disk drive. A read signal is generated from a servo burst pattern in a single servo sector of the disk. A position error signal is generated from the contributions of the servo burst pattern to the read signal. The position error signal is indicative of a radial location of the transducer relative to the disk. A fly height signal is generated from the contributions of the servo burst pattern to the read signal. The fly height signal is indicative of a height of the transducer from the disk.

Some other embodiments of the present invention provide a servo burst demodulator that includes at least one filter, a position error signal determination unit, and a fly height determination unit. The filter is configured to separate contributions of servo bursts in a servo burst pattern to a read signal. The position error signal determination unit is configured to generate a position error signal based on the separated contributions of the servo bursts to the read signal. The position error signal is indicative of a radial location of a transducer relative to a disk in a disk drive. The fly height determination unit is configured to generate a fly height signal based on the separated contributions of the servo bursts to the read signal. The fly height signal is indicative of a height of the transducer from the disk.

DETAILED DESCRIPTION OF THE INVENTION

Figure 1:
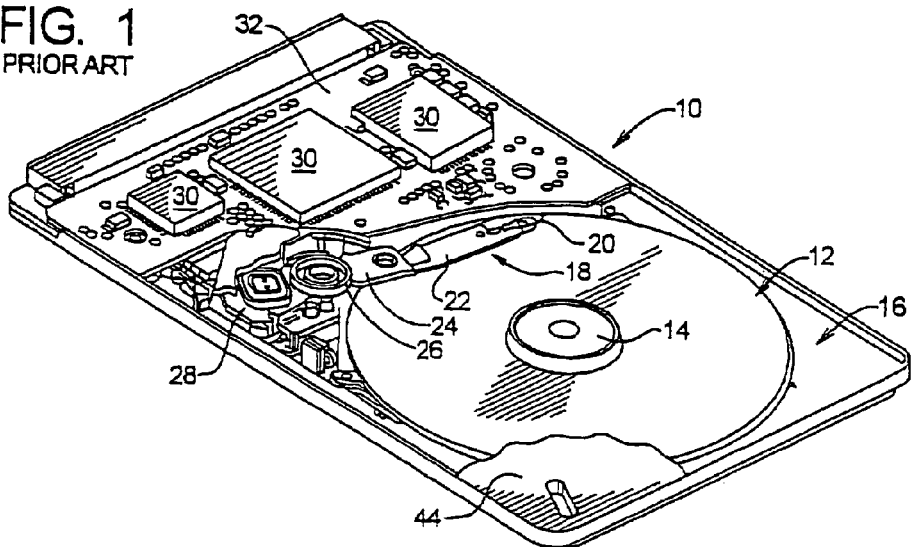
FIG. 1 is a perspective view of a conventional disk drive.
Figure 2:
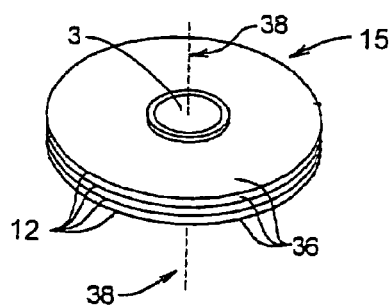
FIG. 2 is a perspective view of a conventional disk stack having a plurality of hard disks.
Figure 3:
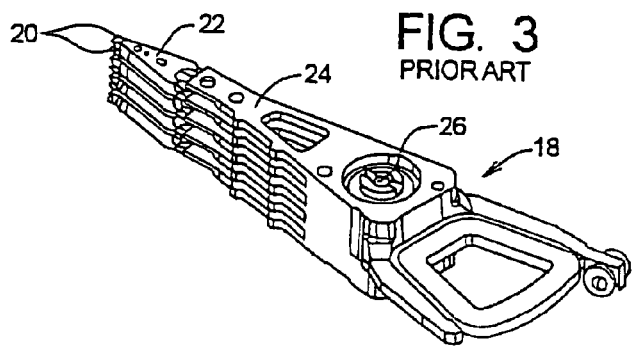
FIG. 3 is a perspective view of a portion of an actuator arm assembly having a plurality of actuator arms.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" includes any and all combinations of one or more of the associated listed items. In the drawings, the size and relative sizes of regions may be exaggerated for clarity.

Some embodiments of the present invention can provide disk drives, servo burst demodulators, and methods. Accordingly, the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams, including operational flow charts, of data storage disks, disk drives, servo burst demodulators, and methods according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 4:
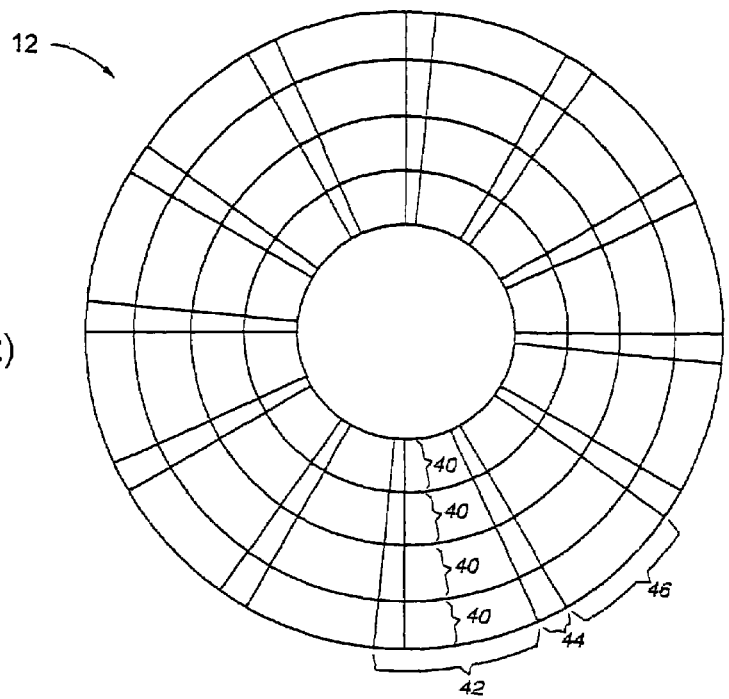
FIG. 4 is a top view of a conventional disk and illustrates tracks and sectors, with each of the sectors being divided into a servo sector and a data sector.
Figure 5:
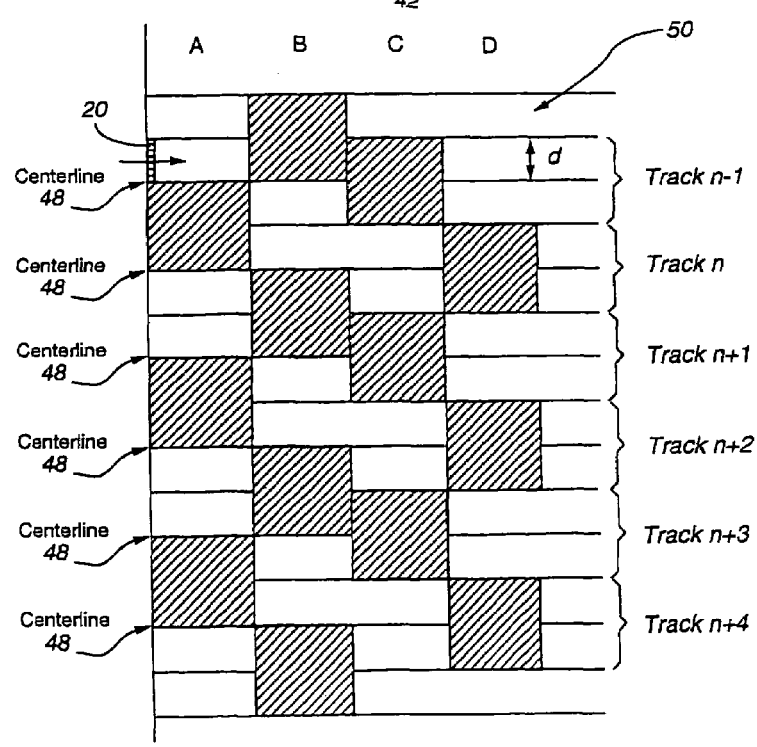
FIG. 5 is a top view of a portion of the disk of FIG. 4 that illustrate a conventional servo burst pattern.
Figure 6:
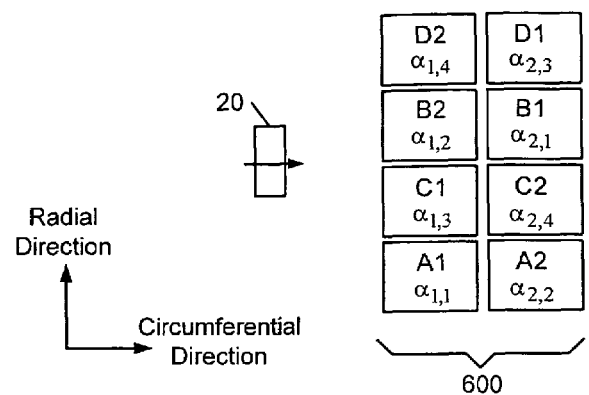
FIG. 6 illustrates a servo burst pattern on a disk in accordance with some embodiments of the present invention.

FIG. 6 illustrates a servo burst pattern 600 in accordance with some embodiments of the present invention, and which may reside in each of the servo sectors 44 of the disk 12 of FIG. 4. The servo burst pattern 600 includes a first group of four radially adjacent and aligned servo bursts A1, C1, B2, and D2, and a second group of four radially adjacent and aligned servo bursts A2, C2, B1, and D1. The first and second group of servo bursts are circumferentially aligned with one another. More particularly, servo bursts A1 and A2 are circumferentially aligned, servo bursts C1 and C2 are circumferentially aligned, servo bursts B2 and B11 are circumferentially aligned, and servo bursts D2 and D1 are circumferentially aligned. As used herein, servo bursts are radially aligned when they are aligned in a direction between an outer and inner periphery of the disk 12. Also as used herein the bursts are circumferentially aligned when they are aligned in a direction along a track on the disk 12.

Each of the servo bursts A1, A2, B1, B2, C1, C2, D1, and D2 is configured to generate a contribution to the read signal when it is cross with sufficient overlap by the transducer 20. In accordance with some embodiments of the present invention, the servo bursts A1, C1, B2, and D2 are each configured to generate a different frequency contribution to the read signal relative to each other. Similarly, the servo bursts A2, C2, B1, and D1 are each configured to generate a different frequency contribution to the read signal relative to each other.

More particularly, with reference to FIG. 6, the exemplary servo bursts A1, A2, B1, B2, C1, C2, D1, and D2 are configured to generate a respective contribution ($\alpha_{x,y}$) to the read signal of $\alpha_{1,1}$, $\alpha_{2,2}$, $\alpha_{2,1}$, $\alpha_{1,2}$, $\alpha_{1,3}$, $\alpha_{2,4}$, $\alpha_{2,3}$, and $\alpha_{1,4}$. In the notation $\alpha_{x,y}$ for the contribution of the servo burst to the read signal, the "x" location refers to whether the servo burst is within the first group ("1") or the second group ("2") of servo bursts, and the "y" location refers to a frequency ("1", "2", "3", "4") of the contribution. Servo burst A1 is within the first group and generates a first frequency contribution $\alpha_{1,1}$ to the read signal, and servo burst A2 is within the second group and generates a second frequency contribution $\alpha_{2,2}$ to the read signal. Likewise, servo burst C1 is within the first group and generates a third frequency contribution $\alpha_{1,3}$ to the read signal, and servo burst C2 which is within the second group and generates a fourth frequency contribution $\alpha_{2,4}$ to the read signal.

Accordingly, when the transducer 20 passes across the servo bursts A1 and C1 at the same time, the read signal includes a first frequency component and a third frequency component. Then, when the transducer 20 subsequently passes across the servo bursts A2 and C2 at the same time, the read signal includes a second frequency component and a fourth frequency component. The separate contributions to the read signal from the servo bursts A1, A2, B1, B2, C1, C2, D1, and D2 are identified based on their frequencies and group locations, and the position of the transducer 20 relative to the servo burst pattern 600 and the fly height of the transducer 20 are determined therefrom.

The servo bursts A1, A2, B1, B2, C1, C2, D1, and D2 can be periodic with different periods relative to each other. The servo bursts may also have a common length (e.g., number of pulses therein) based on the smallest period among them, which may compensate for effects of phase differences between radially adjacent servo bursts (e.g., radial incoherency). Because the servo bursts are divided between first and second groups, the individual servo busts may have one half of the length that they would otherwise have if they were in a single group. For example, if a one complete servo burst would have a length (L) of 12, then the servo bursts A1, A2, B1, B2, C1, C2, D1, and D2 may each have a length (L/2) of 6. The gap between the first and second groups of servo bursts may be, for example, one or two cycles.

Figure 7:
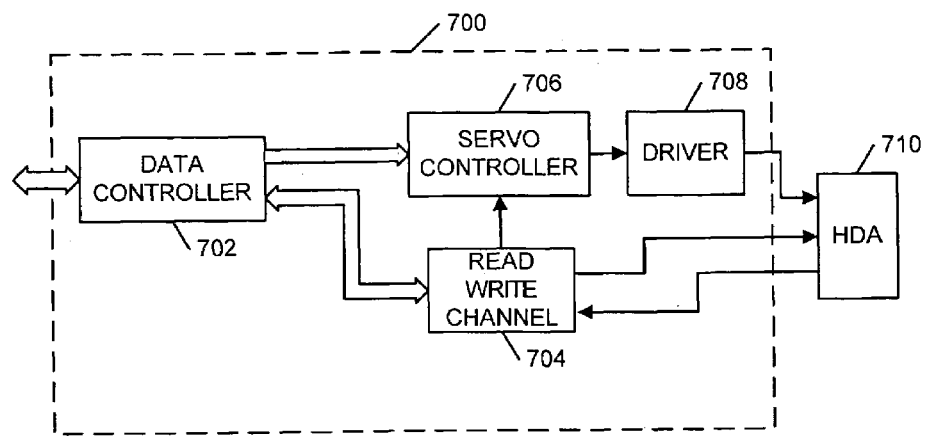
FIG. 7 is a block diagram of electronic circuits of a disk drive, such as the disk drive shown in FIG. 1, that are configured in accordance with some embodiments of the present invention.

Electronic circuits that may be used to determine the position of the transducer 20 and the fly height of the transducer based on the servo burst pattern 600 will now be further discussed with reference to FIGS. 6-8. FIG. 7 is a block diagram of electronic circuits 700 that are configured to position the transducer 20 and determine its fly height based on the contributions of the servo bursts in accordance with some embodiments of the present invention. The electronic circuits 700 may be included within the electronic circuits 30 shown in FIG. 1. The electronic circuits 700 include a data controller 702, a read/write channel 704, a servo controller 706, and a driver 708, which communicates with a head disk assembly 710 (i.e., actuator arm assembly 18, VCM 28, and disk stack 12 of FIG. 1) to seek and follow tracks on the disks 12, and to read/write from the tracks 40 thereon. The servo controller 706 and read/write channel 704 are configured to operate in accordance with various embodiments of the present invention.

The data controller 702 may operate in a conventional manner to format data communicated between a host computer, or other external device, and the disks 12 through the read/write channel 702. The read/write channel 704 may operate in a conventional manner to convert data between the digital form used by the data controller 702 and the analog form used by the transducers 20. The read/write channel 704 also provides the read signal, which is generated by the transducer 20 reading the servo burst patterns on the disk 12, to the servo controller 706. The servo controller 706 uses the read signal to perform seek and track following operations of the transducer 20 relative to data tracks 40.

Figure 8:
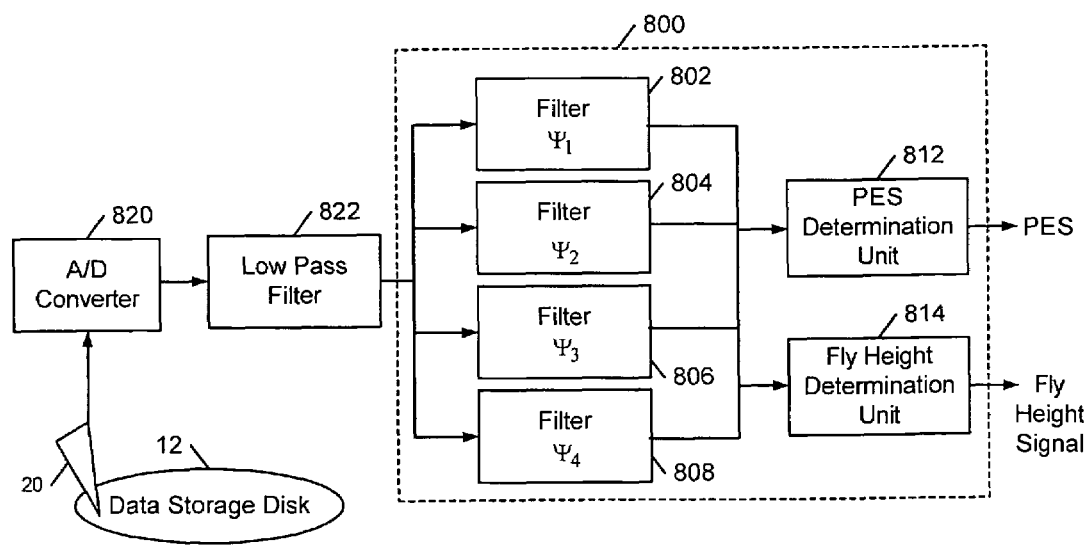
FIG. 8 is a block diagram of a servo burst demodulator within the electronic circuits of FIG. 7, and which is configured to demodulate the servo burst pattern shown in FIG. 6 to generate a position error signal and a fly height signal in accordance with some embodiments of the present invention.

FIG. 8 is a block diagram of a servo burst demodulator 800 that can identify the separate contribution to the read signal from the servo bursts A1, A2, B1, B2, C1, C2, D1, and D2 shown in FIG. 6, in accordance with some embodiments of the present invention. The servo burst demodulator 800 may be at least partially within, for example, the servo controller 706 and/or the read/write channel 704. The transducer 20 reads the servo burst patterns on the disk 12 to generate the read signal. The read signal may be converted to a digital signal by an analog-to-digital converter 820 (e.g., synchronous sampler), and/or it may be filtered by a low pass filter 822 to reduce noise in the signal before it is provided to the servo burst demodulator 800. The read signal can be represented by the following equations:

$$y1 = \alpha_{1,1}\Psi_1 + \alpha_{1,3}\Psi_3 + \alpha_{1,2}\Psi_2 + \alpha_{1,4}\Psi_4 + \text{noise, and}$$

$$y2 = \alpha_{2,2}\Psi_2 + \alpha_{2,4}\Psi_4 + \alpha_{2,1}\Psi_1 + \alpha_{2,3}\Psi_3 + \text{noise}$$

where: y1 is the read signal generated by reading servo bursts in the first group of servo bursts A1, C1, B2, D2; y2 is the read signal generated by reading servo bursts in the second group of servo bursts A2, C2, B11, D1; $\Psi_1$ is a sinusoid of the first frequency; $\Psi_2$ is a sinusoid of the second frequency; $\Psi_3$ is a sinusoid of the third frequency; and $\Psi_4$ is a sinusoid of the fourth frequency; and $\alpha_{1,1}, \alpha_{2,2}, \alpha_{2,1}, \alpha_{1,2}, \alpha_{1,3}, \alpha_{2,4}, \alpha_{2,3}, \alpha_{1,4}$ are the separate contributions of the servo bursts to the read signal as was explained above.

The servo burst demodulator 800 includes four filters 802, 804, 806, 808 that are each configured to generate an indication of a contribution to the read signal from a different one of the frequency components $\Psi_1, \Psi_2, \Psi_3, \Psi_4$ from the servo bursts being overlapped by the transducer 20. For example, filter 802 is configured to identify a contribution to the read signal from any first frequency component $\Psi_1$ from servo bursts A1 and B1. Similarly, filter 804 is configured to identify a contribution to the read signal from any second frequency component $\Psi_2$ from servo bursts A2 and B2. Filter 806 identifies a contribution to the read signal from any third frequency component $\Psi_3$ from servo bursts C1 and D1. Filter 808 identifies a contribution to the read signal from any fourth frequency component $\Psi_4$ from servo bursts C2 and D2. The filters 802, 804, 806, 808 may carry out Discrete Fourier Transform (DFT) operations on the read signal at the different frequencies.

The outputs from the filters 802, 804, 806, 808 represent estimates of the contribution of the servo bursts A1, A2, B1, B2, C1, C2, D1, D2 to the read signal (i.e., an amount of overlap of the transducer 20 and the servo bursts). Each of the filters 802, 804, 806, 808 may include a pair of in-phase and quadrature filters that are matched to different frequency components $\Psi_1, \Psi_2, \Psi_3, \Psi_4$ of the read signal. Each of the estimates may then be determined from a square root of the sum of the squares of the output from the in-phase and quadrature filters of a respective one of the filters 802, 804, 806, 808.

The estimates of the servo burst contributions are provided to a position error signal (PES) determination unit 812 and to a fly height determination unit 814. The PES determination unit 812 generates a PES that is indicative of a radial location of the transducer 20 relative to the servo bursts in the servo burst pattern 600. In one exemplary embodiment, the PES determination unit 812 generates the PES based on the following equation:

$$PES = c * \arctan\left(\frac{(\alpha_{1,1} - \alpha_{2,1}) + (\alpha_{2,2} - \alpha_{1,2})}{(\alpha_{1,3} - \alpha_{2,3}) + (\alpha_{2,4} - \alpha_{1,4})}\right) + b,$$

where: PES is a position error signal; b is a constant; c is a constant; $\alpha_{1,1}$ is the contribution of servo burst A1 to the read signal; $\alpha_{1,2}$ is the contribution of servo burst B2 to the read signal; $\alpha_{2,1}$ is the contribution of servo burst B1 to the read signal; $\alpha_{2,2}$ is the contribution of servo burst A2 to the read signal; $\alpha_{1,3}$ is the contribution of servo burst C1 to the read signal; $\alpha_{2,3}$ is the contribution of servo burst D1 to the read signal; $\alpha_{1,4}$ is the contribution of servo burst D2 to the read signal; and $\alpha_{2,4}$ is the contribution of servo burst C2 to the read signal. The servo controller 706 (FIG. 7) can use the PES from the PES determination unit 812 to position the transducer 20 relative to, for example, the tracks 40 in the data sector 46 of FIG. 4.

The fly height determination unit 814 generates a fly height signal that is indicative of a height of the transducer 20 from the disk 12. The frequency components of the read signal can vary in an exponential manner based on the fly height of the transducer 20 relative to the disk 12. Furthermore, variation in the fly height affects different frequency portions of the frequency spectrum of the read signal differently. Consequently, the fly height determination unit 814 can generate the fly height signal based on a ratio of servo bursts that have different frequencies, and, more particularly, the fly height signal can be generated based on a ratio of two or more circumferentially aligned servo bursts having different frequencies.

In some exemplary embodiments, the fly height determination unit 814 generates the fly height signal based on the following equation:

$$FH = \left(a * \log\left(\frac{\alpha_{1,1} + \alpha_{2,1}}{\alpha_{2,2} + \alpha_{1,2}}\right) + b * \log\left(\frac{\alpha_{1,3} + \alpha_{2,3}}{\alpha_{2,4} + \alpha_{1,4}}\right)\right) + c,$$

where: FH is the fly height signal; a is a constant; b is a constant; c is a constant; $\alpha_{1,1}$ is the contribution of servo burst A1 to the read signal; $\alpha_{1,2}$ is the contribution of servo burst B2 to the read signal; $\alpha_{2,1}$ is the contribution of servo burst B1 to the read signal; $\alpha_{2,2}$ is the contribution of servo burst A2 to the read signal; $\alpha_{1,3}$ is the contribution of servo burst C1 to the read signal; $\alpha_{2,3}$ is the contribution of servo burst D1 to the read signal; $\alpha_{1,4}$ is the contribution of servo burst D2 to the read signal; and $\alpha_{2,4}$ is the contribution of servo burst C2 to the read signal. The servo controller 706 (FIG. 7) may use the fly height signal from the fly height determination unit 814 to compensate for the indicated fly height of the transducer 20 when writing data to and/or reading data from, for example, the data sector 46 of the disk 12 of FIG. 4.

The number of filters in the servo burst demodulator 800 (FIG. 8) may vary with the number of different frequency types of servo bursts in the servo burst pattern. For example, three filters may be used to identify the contribution of three different frequency types of servo bursts to the read signal, and five filters may be used to identify the contribution from five different frequency types of servo bursts.

Figure 9:
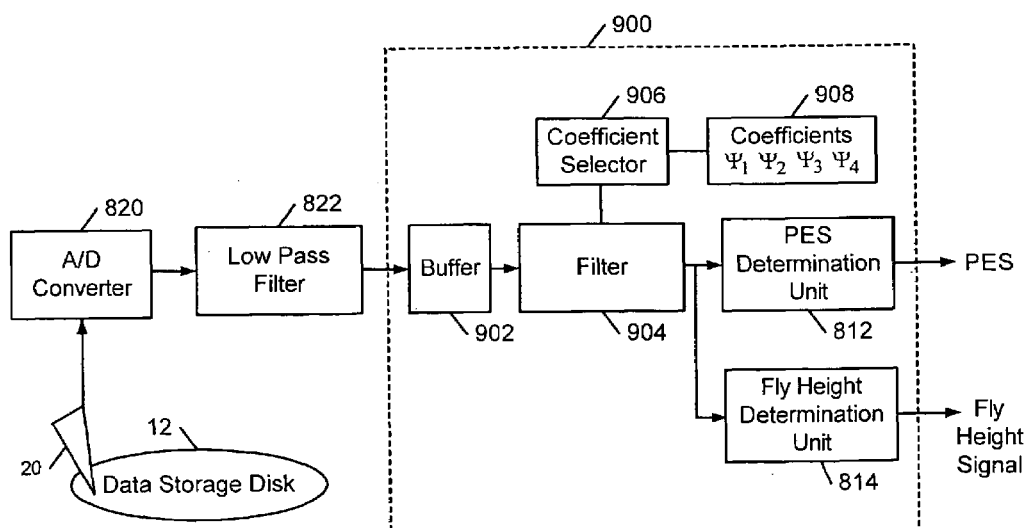
FIG. 9 is a block diagram of a servo burst demodulator within the electronic circuits of FIG. 7, and which is configured to demodulate the servo burst pattern shown in FIG. 6 to generate a position error signal and a fly height signal in accordance with some other embodiments of the present invention.

FIG. 9 is a block diagram of a servo burst demodulator 900 according to another embodiment of the present invention. The servo burst demodulator 900 includes a buffer 902, a filter 904, a coefficient selector 906, a plurality of coefficients 908, and the PES determination unit 812 and fly height determination unit 814 that were described with regard to FIG. 8. In contrast to the demodulator 800 of FIG. 8, the demodulator 900 of FIG. 9 uses a single filter 904 to separate the different frequency components of the read signal.

The demodulator 900 can receive a digitized and low pass filtered read signal from the analog-to-digital converter 920 (e.g., synchronous sampler) and low pass filter 922, as was explained with regard to FIG. 8. The demodulator 900 buffers the read signal in a buffer 902. The filter 904 sequentially separates the different frequency components of the read signal in the buffer 902. More particularly, the filter 904 filters the buffered read signal using coefficients 908 that are tuned to a first one of the frequencies $\Psi_1$, $\Psi_2$, $\Psi_3$, $\Psi_4$. The filter 804 then filters the buffered read signal using coefficients 908 that are tuned to a second one of the frequencies $\Psi_1$, $\Psi_2$, $\Psi_3$, $\Psi_4$. The filter 804 repeats the filtering of the buffered read signal using coefficients 908 that are tuned to a third, and then a fourth, one of the frequencies $\Psi_1$, $\Psi_2$, $\Psi_3$, $\Psi_4$. The coefficient selector 906 selects and provides the coefficients 908 to the filter 904 for each filtering repetition.

The filter 904 outputs the contribution of the servo bursts A1, A2, B1, B2, C1, C2, D1, D2 to the read signal to the PES determination unit 812 and to the fly height determination unit 814. The PES determination unit 812 generates a PES that is indicative of a radial location of the transducer 20 relative to the servo bursts in the servo burst pattern 600, as was explained above with regard to FIG. 8. The fly height determination unit 814 generates a fly height signal that is indicative of a height of the transducer 20 from the disk 12, as was explained above with regard to FIG. 8.

Figure 10:
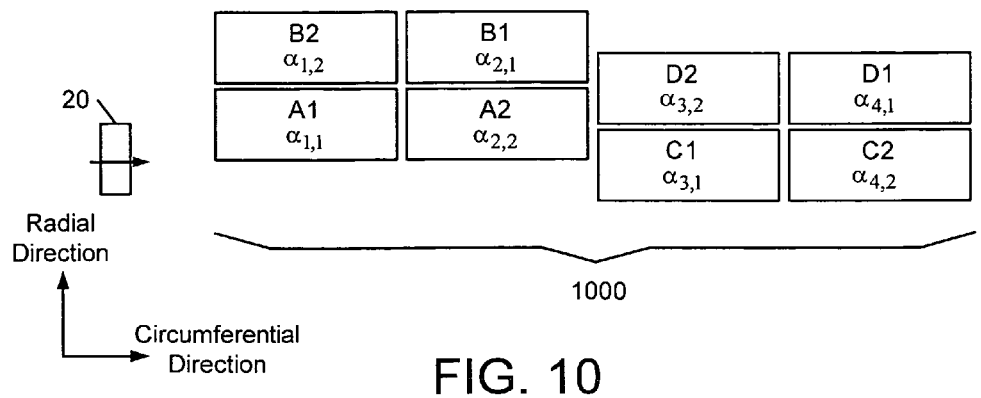
FIG. 10 illustrates a servo burst pattern on a disk in accordance with some other embodiments of the present invention.

FIG. 10 illustrates a servo burst pattern 1000 that is configured in accordance with some other embodiments of the present invention, and which may reside in each of the servo sectors 44 of the disk 12 of FIG. 4. The servo burst pattern 1000 includes two groups of servo bursts that are radially offset about a half servo track from each other. The first group of servo bursts includes a first pair of radially adjacent and aligned servo bursts A1, B2 and a second pair of radially adjacent and aligned servo bursts A2, B1. The servo bursts A1, B2 in the first pair are circumferentially aligned with respectively ones of the servo bursts A2, B1 in the second pair. Similarly, the second group of servo bursts includes a first pair of radially adjacent and aligned servo bursts C1, D2 and a second pair of radially adjacent and aligned servo bursts C2, D1. The servo bursts C1, D2 in the first pair are circumferentially aligned with respectively ones of the servo bursts C2, D1 in the second pair.

Each of the servo bursts A1, A2, B1, B2, C1, C2, D1, and D2 is configured to generate a contribution to the read signal when it is cross with sufficient overlap by the transducer 20. In accordance with some embodiments of the present invention, the servo bursts A1, B1, C1, D1 are each configured to generate a first frequency contribution to the read signal. Similarly, the servo bursts A2, B2, C2, D2 are each configured to generate a different second frequency contribution to the read signal.

More particularly, with reference to FIG. 10, the exemplary servo bursts A1, A2, B1, B2, C1, C2, D1, and D2 are configured to generate a respectively contribution ($\alpha_{x,y}$) to the read signal of $\alpha_{1,1}$, $\alpha_{2,2}$, $\alpha_{1,2}$, $\alpha_{2,1}$, $\alpha_{3,1}$, $\alpha_{4,2}$, $\alpha_{4,1}$, and $\alpha_{3,2}$. In the notation $\alpha_{x,y}$ for the contribution of the servo burst to the read signal, the "x" location refers to whether the servo burst is within the first ("1"), second ("2"), third ("3"), or fourth ("4") pair of servo bursts, and the "y" location refers to a frequency ("1" or "2") of the contribution. For example, servo burst A1 is within the first pair and generates a first frequency contribution $\alpha_{1,1}$ to the read signal, and servo burst A2 is within the second pair and generates a second frequency contribution $\alpha_{2,2}$ to the read signal.

Accordingly, when the transducer 20 passes across the servo bursts A1 and B2 at the same time, the read signal includes a first frequency contribution from servo burst A1 and a second frequency contribution from servo burst B2. Then, when the transducer 20 subsequently passes across the servo bursts A2 and B1 at the same time, the read signal includes a first frequency contribution from servo burst B1 and a second frequency contribution from servo burst A2. The separate contributions to the read signal from the servo bursts A1, A2, B1, B2, C1, C2, D1, and D2 are identified based on the frequency of the contributions, and the position of the transducer 20 relative to the servo burst pattern 1000 and the fly height of the transducer 20 are determined therefrom.

Figure 11:
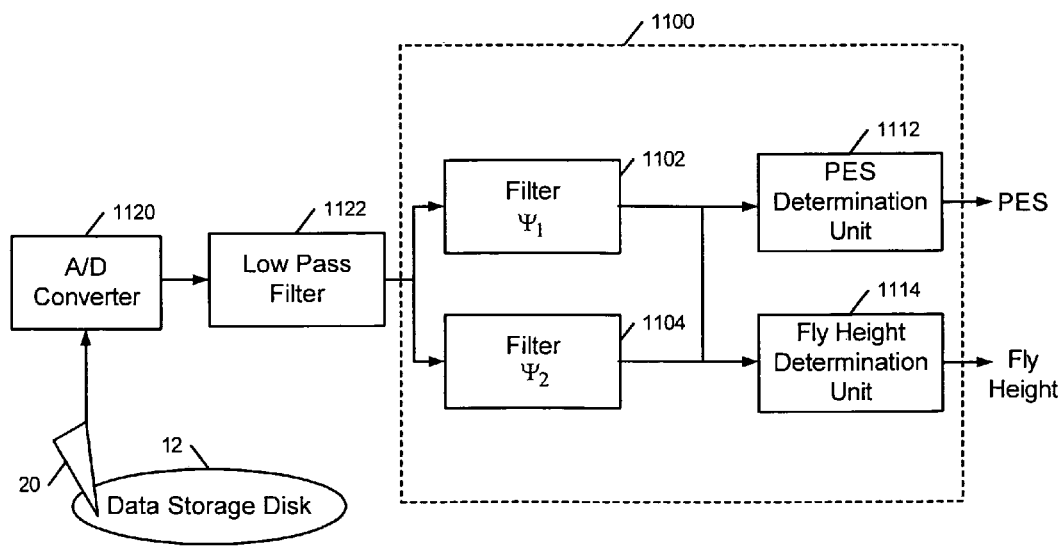
FIG. 11 is a block diagram of a servo burst demodulator within the electronic circuits of FIG. 7, and which is configured to demodulate the servo burst pattern shown in FIG. 10 to generate a position error signal and a fly height signal in accordance with some embodiments of the present invention.

FIG. 11 is a block diagram of a servo burst demodulator 1100 that can identify the separate contribution to the read signal from the exemplary servo bursts A1, A2, B1, B2, C1, C2, D1, and D2 shown in FIG. 10, in accordance with some embodiments of the present invention. The servo burst demodulator 1100 may be at least partially within, for example, the servo controller 706 and/or the read/write channel 704 of FIG. 7. The transducer 20 reads the servo burst patterns on the disk 12 to generate the read signal. The read signal may be converted to a digital signal by an analog-to-digital converter 1120, and/or it may be filtered by a low pass filter 1122 to reduce noise in the signal before it is provided to the servo burst demodulator 1100. The read signal can be represented by the following equations:

$y1 = \alpha_{1,1}\Psi_1 + \alpha_{1,2}\Psi_2 + \text{noise}$ $y2 = \alpha_{2,2}\Psi_2 + \alpha_{2,1}\Psi_1 + \text{noise}$ $y3 = \alpha_{3,1}\Psi_1 + \alpha_{3,2}\Psi_2 + \text{noise}$ $y4 = \alpha_{4,2}\Psi_2 + \alpha_{4,1}\Psi_1 + \text{noise}$ where: y1 is the read signal generated by reading the first pair of servo bursts A1, B2; y2 is the read signal generated by reading the second pair of servo bursts A2, B1; y3 is the read signal generated by reading the third pair of servo bursts C1, D2; y4 is the read signal generated by reading the fourth pair of servo bursts C2, D1; $\Psi_1$ is a sinusoid of the first frequency; $\Psi_2$ is a sinusoid of the second frequency; and $\alpha_{1,1}, \alpha_{1,2}, \alpha_{2,1}, \alpha_{2,2}, \alpha_{3,1}, \alpha_{3,2}, \alpha_{4,1}, \alpha_{4,2}$ are the separate contributions of the servo bursts to the read signal as was explained above.

The servo burst demodulator 1100 includes two filters 1102 and 1104 that are each configured to isolate, as an output therefrom, a contribution to the read signal from a different one of the frequency components $\Psi_1$, $\Psi_2$. For example, filter 1102 is configured to isolate the first frequency component $\Psi_1$ of the read signal from servo bursts A1, B1, C1, D1. Similarly, filter 1104 is configured to isolate the second frequency component $\Psi_2$ from servo bursts A2, B2, C2, D2.

The output from the filters 1102 and 1104 represent estimates of the contribution of the servo bursts A1, A2, B1, B2, C1, C2, D1, D2 to the read signal (i.e., an amount of overlap of the transducer 20 and the servo bursts). Each of the filters 1102 and 1104 may include a pair of in-phase and quadrature filters that are matched to different frequency components $\Psi_1$, $\Psi_2$ of the read signal. Each of the estimates may then be determined from a square root of the sum of the squares of the output from the in-phase and quadrature filters of a respective one of the filters 1102 and 1104.

The estimates of the servo burst contributions are provided to a position error signal (PES) determination unit 1112 and to a fly height determination unit 1114. The PES determination unit 1112 generates a PES that is indicative of a radial location of the transducer 20 relative to the servo bursts in the servo burst pattern 1000. In one exemplary embodiment, the PES determination unit 1112 generates the PES based on the following equation:

$$PES = c * \arctan\left(\frac{(\alpha_{1,1} - \alpha_{2,1}) + (\alpha_{2,2} - \alpha_{1,2})}{(\alpha_{3,1} - \alpha_{4,1}) + (\alpha_{4,2} - \alpha_{3,2})}\right) + b,$$

where: PES is the position error signal; b is a constant; c is a constant; $\alpha_{1,1}$ is the contribution of servo burst A1 to the read signal; $\alpha_{1,2}$ is the contribution of servo burst B2 to the read signal; $\alpha_{2,1}$ is the contribution of servo burst B1 to the read signal; $\alpha_{2,2}$ is the contribution of servo burst A2 to the read signal; $\alpha_{3,1}$ is the contribution of servo burst C1 to the read signal; $\alpha_{3,2}$ is the contribution of servo burst D2 to the read signal; $\alpha_{4,1}$ is the contribution of servo burst D1 to the read signal; and $\alpha_{4,2}$ is the contribution of servo burst C2 to the read signal.

The servo controller 706 (FIG. 7) can use the PES from the PES determination unit 1112 to position the transducer 20 relative to, for example, the tracks 40 in the data sector 46 of FIG. 4.

The fly height determination unit 1114 generates a fly height signal that is indicative of a height of the transducer 20 from the disk 12. In one exemplary embodiment, the fly height determination unit 1114 generates the fly height signal based on the following equation:

$$FH = \left(a * \log\left(\frac{\alpha_{1,1} + \alpha_{2,1}}{\alpha_{2,2} + \alpha_{1,2}}\right) + b * \log\left(\frac{\alpha_{3,1} + \alpha_{4,1}}{\alpha_{4,2} + \alpha_{3,2}}\right)\right) + c,$$

where: FH is the fly height signal; a is a constant; b is a constant; c is a constant; $\alpha_{1,1}$ is the contribution of servo burst A1 to the read signal; $\alpha_{1,2}$ is the contribution of servo burst B2 to the read signal; $\alpha_{2,1}$ is the contribution of servo burst B1 to the read signal; $\alpha_{2,2}$ is the contribution of servo burst A2 to the read signal; $\alpha_{3,1}$ is the contribution of servo burst C1 to the read signal; $\alpha_{3,2}$ is the contribution of servo burst D2 to the read signal; $\alpha_{4,1}$ is the contribution of servo burst D1 to the read signal; and $\alpha_{4,2}$ is the contribution of servo burst C2 to the read signal.

The servo controller 706 (FIG. 7) may use the fly height signal from the fly height determination unit 1114 to compensate for the indicated fly height of the transducer 20 when writing data to and/or reading data from, for example, the data sector 46 of the disk 12 of FIG. 4.

Figure 12:
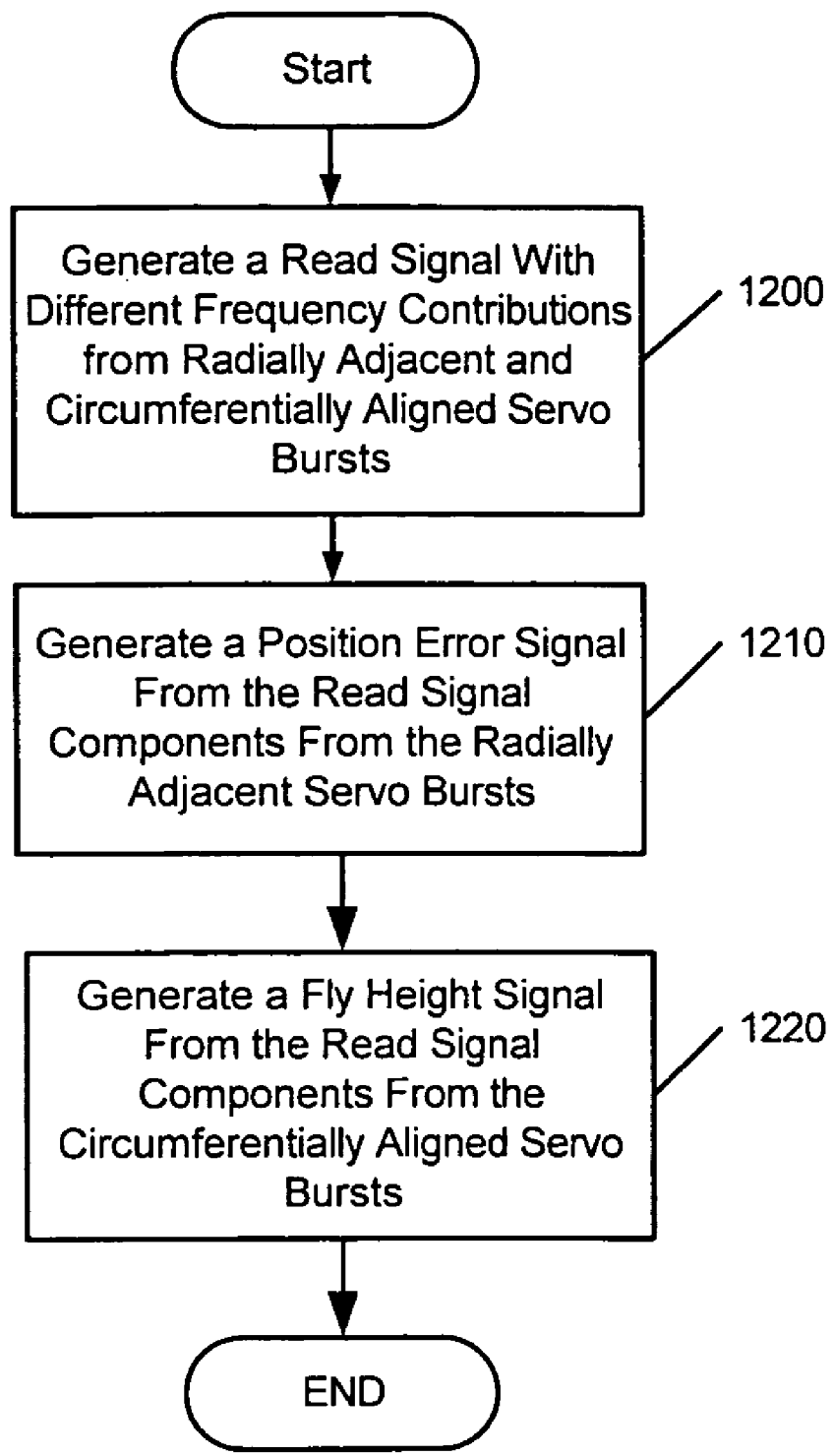
FIG. 12 illustrates a flowchart of operations for demodulating servo burst patterns to generate a position error signal and a fly height signal in accordance with some embodiments of the present invention.

FIG. 12 illustrates a flowchart of operations for demodulating servo burst patterns to generate a position error signal and a fly height signal in accordance with some embodiments of the present invention. At Block 1200, a read signal is generated that has different frequency contributions from radially adjacent and circumferentially aligned servo burst patterns. At Block 1210, a position error signal is generated from the read signal contributions from the radially adjacent servo bursts. At Block 1220, a fly height signal is generated from the read signal contributions from the circumferentially aligned servo bursts. Accordingly, radially adjacent servo bursts can be distinguished from one another based on their different frequencies, and circumferentially adjacent servo bursts can be distinguished from one another based on their different frequencies. The position error signal and fly height signal can then be generated based on the separate contributions of the radially adjacent and/or circumferentially adjacent servo bursts.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive comprising:
    a rotatable data storage disk comprising a servo burst pattern in a single servo sector thereon, the servo burst pattern comprising at least a first pair of radially adjacent servo bursts and a second pair of radially adjacent servo bursts, wherein the first pair of radially adjacent servo bursts is circumferentially aligned with the second pair of servo bursts;

a transducer that is configured to generate a read signal from the servo burst pattern on the disk; and a servo burst demodulator configured to determine a separate contribution to the read signal from the circumferentially adjacent ones of the first and second pairs of servo bursts and a separate contribution to the read signal from the radially adjacent ones of the first and second pairs of servo bursts, configured to generate a position error signal based on the determined contribution to the read signal from the radially adjacent ones of the servo bursts, and configured to generate a fly height signal based on the determined contribution to the read signal from the circumferentially adjacent ones of the servo bursts.

2. The disk drive of claim 1, wherein the servo burst demodulator is configured to generate the fly height signal based on a logarithm of a ratio of the determined contribution to the read signal from the circumferentially adjacent ones of the servo bursts.

3. The disk drive of claim 2, wherein the servo burst demodulator is configured to generate the position error signal based on an arctangent of a ratio of the determined contribution to the read signal from the radially adjacent ones of the servo bursts.

4. The disk drive of claim 1, wherein:

the servo bursts in the first pair of radially adjacent servo bursts are configured to generate contributions to the read signal that have different frequencies from one another; and the servo bursts in the second pair of radially adjacent servo bursts are configured to generate contributions to the read signal that have different frequencies from one another.

5. The disk drive of claim 4, wherein the circumferentially aligned ones of the servo bursts in the first and second pairs are configured to generate contributions to the read signal that have different frequencies from one another.

6. The disk drive of claim 5, wherein:

the servo burst pattern on the disk further comprises third and fourth pairs of radially adjacent servo bursts, wherein the third pair of radially adjacent servo bursts is radially offset and circumferentially adjacent to the second pair of servo bursts and is circumferentially aligned with the fourth pair of servo bursts;

the first pair of servo bursts comprise servo bursts A1 and B2 that are radially aligned to one other, A1 is configured to generate a contribution to the read signal that has a first frequency and B2 is configured to generate a contribution to the read signal that has a second frequency;

the second pair of servo bursts comprise servo bursts A2 and B1 that are radially aligned to one other, A2 is configured to generate a contribution to the read signal that has the second frequency, and B1 is configured to generate a contribution to the read signal that has the first frequency, A2 is circumferentially aligned with and adjacent to A1, B1 is circumferentially aligned with and adjacent to B2;

the third pair of servo bursts comprise servo bursts C1 and D2 that are radially aligned to one other, C1 is configured to generate a contribution to the read signal that has the first frequency, and D2 is configured to generate a contribution to the read signal that has the second frequency, C1 is radially offset from and circumferentially adjacent to A2, D2 is radially offset from and adjacent to B1;

the fourth pair of servo bursts comprise servo bursts C2 and D1 that are radially aligned to one other, C2 is configured to generate a contribution to the read signal that has the second frequency, and D1 is configured to generate a contribution to the read signal that has the first frequency, C2 is circumferentially aligned with and adjacent to C1, D1 is circumferentially aligned with and adjacent to D2.

7. The disk drive of claim 6, wherein:

the servo burst demodulator is configured to generate the fly height signal based on the following equation:

$$FH = \left(a * \log\left(\frac{\alpha_{1,1} + \alpha_{2,1}}{\alpha_{2,2} + \alpha_{1,2}}\right) + b * \log\left(\frac{\alpha_{3,1} + \alpha_{4,1}}{\alpha_{4,2} + \alpha_{3,2}}\right)\right) + c,$$

wherein FH comprises the fly height signal, a is a constant, b is a constant, c is a constant, $\alpha_{1,1}$ is the contribution of servo burst A1 to the read signal, $\alpha_{1,2}$ is the contribution of servo burst B2 to the read signal, $\alpha_{2,1}$ is the contribution of servo burst B1 to the read signal, $\alpha_{2,2}$ is the contribution of servo burst A2 to the read signal, $\alpha_{3,1}$ is the contribution of servo burst C1 to the read signal, $\alpha_{3,2}$ is the contribution of servo burst D2 to the read signal, $\alpha_{4,1}$ is the contribution of servo burst D1 to the read signal, $\alpha_{4,2}$ is the contribution of servo burst C2 to the read signal.

8. The disk drive of claim 6, wherein:

the servo burst demodulator is configured to generate the position error signal based on the following equation:

$$PES = c * \arctan\left(\frac{(\alpha_{1,1} - \alpha_{2,1}) + (\alpha_{2,2} - \alpha_{1,2})}{(\alpha_{3,1} - \alpha_{4,1}) + (\alpha_{4,2} - \alpha_{3,2})}\right) + b,$$

wherein PES comprises the position error signal, b is constant, c is a constant, $\alpha_{1,1}$ is the contribution of servo burst A1 to the read signal, $\alpha_{1,2}$ is the contribution of servo burst B2 to the read signal, $\alpha_{2,1}$ is the contribution of servo burst B1 to the read signal, $\alpha_{2,2}$ is the contribution of servo burst A2 to the read signal, $\alpha_{3,1}$ is the contribution of servo burst C1 to the read signal, $\alpha_{3,2}$ is the contribution of servo burst D2 to the read signal, $\alpha_{4,1}$ is the contribution of servo burst D1 to the read signal, $\alpha_{4,2}$ is the contribution of servo burst C2 to the read signal.

9. The disk drive of claim 5, wherein:

one of the servo bursts in the first pair of radially adjacent servo bursts is configured to generate a contribution to the read signal that has a first frequency and the other one of the servo bursts in the first pair is configured to generate a contribution to the read signal that has a second frequency; and one of the servo bursts in the second pair of radially adjacent servo bursts is configured to generate a contribution to the read signal that has the first frequency and the other one of the servo bursts in the second pair is configured to generate a contribution to the read signal that has the second frequency.

10. The disk drive of claim 9, wherein:

the servo burst demodulator comprises at least two filters, one of the filters is configured to isolate the contribution to the read signal that has the first frequency, and another one of the filters is configured to isolate the contribution to the read signal that has the second frequency, and is configured to identify the separate contribution to the read signal from the servo bursts in the first and second pairs based on the contributions to the read signal from the filters.

11. The disk drive of claim 9, wherein:

the servo bursts in the first pair of radially adjacent servo bursts are periodic with different periods relative to each other, and have a length that is an integer multiple of the smallest period of the servo bursts in the first pair; and the servo bursts in the second pair of radially adjacent servo bursts have the same length as the servo bursts in the first pair.

12. A disk drive comprising:

a rotatable data storage disk comprising a servo burst pattern in a single servo sector thereon, the servo burst pattern comprising a first group of four radially adjacent and aligned servo bursts and a second group of four radially adjacent and aligned servo bursts, the first and second groups of servo bursts are circumferentially aligned with one another, radially aligned ones of the servo bursts are configured to generate contributions to the read signal that have different frequencies from one another, circumferentially aligned ones of the servo bursts are configured to generate contributions to the read signal that have different frequencies from one another; and a servo burst demodulator configured to determine a separate contribution to the read signal from the circumferentially adjacent ones of the servo bursts and a separate contribution to the read signal from the radially aligned ones of the servo bursts, configured to generate a position error signal based on the determined contribution to the read signal from the radially aligned ones of the servo bursts, and configured to generate a fly height signal based on the determined contribution to the read signal from the circumferentially aligned ones of the servo bursts.

13. The disk drive of claim 12, wherein:

the first group of four radially aligned servo bursts comprises servo bursts A1, C1, B2, D2;

the second group of four radially adjacent servo bursts comprises servo bursts A2, C2, B1, D1;

A1 and A2 are circumferentially aligned and are configured to generate contributions to the read signal that have different frequencies from one another;

C1 and C2 are circumferentially aligned and are configured to generate contributions to the read signal that have different frequencies from one another;

B1 and B2 are circumferentially aligned and are configured to generate contributions to the read signal that have different frequencies from one another; and D1 and D2 are circumferentially aligned and are configured to generate contributions to the read signal that have different frequencies from one another.

14. The disk drive of claim 12, wherein:

the servo burst demodulator is configured to generate the fly height signal based on the following equation:

$$FH = \left( a * \log\left( \frac{\alpha_{1,1} + \alpha_{2,1}}{\alpha_{2,2} + \alpha_{1,2}} \right) + b * \log\left( \frac{\alpha_{1,3} + \alpha_{2,3}}{\alpha_{2,4} + \alpha_{1,4}} \right) \right) + c,$$

wherein FH comprises the fly height signal, a is a constant, b is a constant, c is a constant, $\alpha_{1,1}$ is the contribution of servo burst A1 to the read signal, $\alpha_{1,2}$ is the contribution of servo burst B2 to the read signal, $\alpha_{2,1}$ is the contribution of servo burst B1 to the read signal, $\alpha_{2,2}$ is the contribution of servo burst A2 to the read signal, $\alpha_{1,3}$ is the contribution of servo burst C1 to the read signal, $\alpha_{2,3}$ is the contribution of servo burst D1 to the read signal, $\alpha_{1,4}$ is the contribution of servo burst D2 to the read signal, $\alpha_{2,4}$ is the contribution of servo burst C2 to the read signal.

15. The disk drive of claim 12, wherein:

the servo burst demodulator is configured to generate the position error signal based on the following equation:

$$PES = c * \arctan\left( \frac{(\alpha_{1,1} - \alpha_{2,1}) + (\alpha_{2,2} - \alpha_{1,2})}{(\alpha_{1,3} - \alpha_{2,3}) + (\alpha_{2,4} - \alpha_{1,4})} \right) + b,$$

wherein PES comprises the position error signal, b is a constant, c is a constant, $\alpha_{1,1}$ is the contribution of servo burst A1 to the read signal, $\alpha_{1,2}$ is the contribution of servo burst B2 to the read signal, $\alpha_{2,1}$ is the contribution of servo burst B1 to the read signal, $\alpha_{2,2}$ is the contribution of servo burst A2 to the read signal, $\alpha_{1,3}$ is the contribution of servo burst C1 to the read signal, $\alpha_{2,3}$ is the contribution of servo burst D1 to the read signal, $\alpha_{1,4}$ is the contribution of servo burst D2 to the read signal, $\alpha_{2,4}$ is the contribution of servo burst C2 to the read signal.

16. The disk drive of claim 12, wherein:

the servo bursts A1 and B1 are configured to generate contributions of a first frequency to the read signal;

the servo bursts A2 and B2 are configured to generate contributions of a second frequency to the read signal;

the servo bursts C1 and D1 are configured to generate contributions of a third frequency to the read signal;

the servo bursts C2 and D2 are configured to generate contributions of a fourth frequency to the read signal; and the servo burst demodulator comprises at least four filters, one of the filters is configured to isolate the contribution to the read signal that has the first frequency, another one of the filters is configured to isolate the contribution to the read signal that has the second frequency, another one of the filters is configured to isolate the contribution to the read signal that has the third frequency, and another one of the filters is configured to isolate the contribution to the read signal that has the fourth frequency, and is configured to identify the separate contribution to the read signal from the servo bursts in the first and second groups of servo bursts based on the contributions to the read signal identified by the filters.

17. The disk drive of claim 12, wherein:

the servo burst demodulator comprises a buffer and a filter, the buffer is configured to at least temporarily hold the contributions to the read signal from at least one of the first and second groups of servo bursts, and the filter is configured to sequentially output the contribution from separate ones of the servo bursts in the buffer.

18. A method of generating information on a radial position and height of a transducer relative to a rotatable data storage disk, the method comprising:

generating a read signal from a servo burst pattern in a single servo sector of the disk;

generating a position error signal from contributions of radially adjacent servo bursts of the servo burst pattern to the read signal, wherein the position error signal is indicative of a radial location of the transducer relative to the disk; and generating a fly height signal from the contributions of circumferentially adjacent servo bursts of the servo burst pattern to the read signal, wherein the fly height signal is indicative of a height of the transducer from the disk.

19. A servo burst demodulator comprising:

at least one filter that is configured to separate contributions of servo bursts in a servo burst pattern to a read signal;

a position error signal determination unit that is configured to generate a position error signal based on the separated contributions of radially adjacent ones of the servo bursts to the read signal, wherein the position error signal is indicative of a radial location of a transducer relative to a disk in a disk drive; and a fly height determination unit that is configured to generate a fly height signal based on the separated contributions of circumferentially adjacent ones of the servo bursts to the read signal, wherein the fly height signal is indicative of a height of the transducer from the disk.

* * * * *